United States Patent
Smith (10) Patent No.: US 8,828,299 B2
(45) Date of Patent: Sep. 9, 2014

(54) INJECTION MOULDING PLASTIC COMPONENTS WITH A SLIT

(75) Inventor: Matthew Eric Smith, Isle of Man (GB)

(73) Assignee: Carbonite Corporation, WTC (PA)

( * ) Notice: Subject to any disclaimer, the term of this patent is extended or adjusted under 35 U.S.C. 154(b) by 296 days.

(21) Appl. No.: 13/279,059

(22) Filed: Oct. 21, 2011

(65) Prior Publication Data
US 2013/0026677 A1    Jan. 31, 2013

(30) Foreign Application Priority Data
Jul. 28, 2011    (GB) .................................. 1113097.8

(51) Int. Cl.
| | | |
|---|---|---|
| B29C 45/34 | (2006.01) | |
| B29C 45/00 | (2006.01) | |
| B65D 47/08 | (2006.01) | |
| B65D 47/20 | (2006.01) | |
| B29L 31/00 | (2006.01) | |

(52) U.S. Cl.
CPC ............. *B29C 45/0046* (2013.01); *B29C 45/34* (2013.01); *B29C 45/0081* (2013.01); *B65D 47/0804* (2013.01); *B29L 2031/7506* (2013.01); *B65D 47/2031* (2013.01)
USPC .................... 264/328.8; 264/328.12

(58) Field of Classification Search
CPC .................. B29L 2031/7506; B65D 47/0804; B65D 47/2031; B29C 45/0046; B29C 45/0081; B29C 45/34
USPC ....................... 264/328.8, 328.9, 328.12, 255
See application file for complete search history.

(56) References Cited

U.S. PATENT DOCUMENTS

| | | | | |
|---|---|---|---|---|
| 3,499,572 A | * | 3/1970 | Ruekberg | ....................... 220/270 |
| 4,524,805 A | | 6/1985 | Hoffman | |
| 5,431,290 A | | 7/1995 | Vinciguerra | |
| 5,868,990 A | * | 2/1999 | Campbell | ................ 264/328.12 |
| 5,897,828 A | | 4/1999 | Sillince et al. | |
| 6,053,194 A | * | 4/2000 | Nelson et al. | .................... 137/70 |
| 6,136,253 A | | 10/2000 | Bennett | |
| 2007/0114250 A1 | * | 5/2007 | Langseder et al. | ............ 222/494 |
| 2007/0295763 A1 | | 12/2007 | Brunner et al. | |
| 2009/0314856 A1 | * | 12/2009 | Romanov et al. | .......... 239/288.5 |

FOREIGN PATENT DOCUMENTS

| | | | |
|---|---|---|---|
| JP | 60004039 A | | 1/1985 |
| WO | WO 88/08782 | * | 11/1988 |
| WO | WO 2009/097428 | * | 8/2009 |

* cited by examiner

*Primary Examiner* — Jill Heitbrink
(74) *Attorney, Agent, or Firm* — Kaplan Breyer Schwarz & Ottesen, LLP; Harry K. Ahn, Esq.

(57) ABSTRACT

Method of injection molding a plastics component includes providing a first mold member with a mold cavity, defined by an internal surface, and a second mold member with an external surface complementary to the mold cavity shape. Either the internal or external surface carry an elongate formation with an elongate apex. Then, the second mold member is advanced into the mold cavity such that the apex is spaced from the opposed one of the internal surface and the external surface by a predetermined distance and the internal surface of the first mold member and the external surface of the second mold member together define a mold space. Molten polyolefin material is then injected into the mold space to substantially fill it. The predetermined distance is so dimensioned that the polyolefin material does not completely fill the space between the apex and the opposed surface and the slit is thus formed.

17 Claims, 7 Drawing Sheets

INJECTION MOULDING PLASTIC COMPONENTS WITH A SLIT

CROSS-REFERENCE TO RELATED APPLICATIONS

This application is based on and claims priority from British Patent Application No. 1113097.8, filed on Jul. 28, 2011, the disclosure of which is incorporated herein in its entirety by reference.

FIELD OF THE INVENTION

The present invention relates to a method of injection moulding plastics components with a slit. There are many instances in which it is desired to injection mould a plastics component with a slit formed in it, that is to say a linear discontinuity at which the edges of the material substantially abut one another or are spaced apart by only a very small distance but are not connected together such that at least limited relative movement of the material on the two sides of the slit is possible.

DESCRIPTION OF THE PRIOR ART

One field of application of such components is fluid flow valves, particularly dispensing valves for dispensing viscous liquids or pasty materials, such as shower gel, hair conditioner, tomato ketchup or the like. Such valves are usually fitted to the mouth of a deformable container, typically moulded from thermoplastic material and, when it is wished to dispense the contents of the container, the container is inverted and deformed by squeezing. The internal pressure of the container is thereby increased which results in opening of the valve and dispensing through it of the container contents. When the desired amount of material has been dispensed, the pressure applied to the container is removed and the container begins to expand to its original shape. The reduced pressure which is thereby produced in the container results in termination of the dispensing process and in re-closing of the valve. It is desirable that the valve then forms a substantial seal, that is to say is sealed to the passage of the viscous or pasty material, and this is particularly important in a container for e.g. shower gel which is usually stored in the inverted state so as to prevent the contents of the container from leaking or dripping through the valve. The seal desirably also constitutes a substantial air seal because it is of course very undesirable for atmospheric air to have free access to the interior of the container if the container is used for perishable material, such as mayonnaise or mustard, because this would result in biodegradation of the material. It is, however, desirable that the valve does not form a total air seal because it should be able to admit air sufficient to permit the container to re-expand to its original shape.

Many different types of valve which operate in this general manner are known and one of the more common types includes a disc of silicone rubber in which two perpendicular slits in a cruciform configuration are formed. Such valves are widely used and are very effective but suffer from the disadvantages that silicone rubber is expensive and difficult to work with and that the valve must necessarily comprise two different components which must be connected together, that is to say a valve body of e.g. injection moulded thermoplastic material and the valve member itself of silicone rubber. Prior to the connection of the two components, the slits must be formed in the disc of silicone rubber and this represents an expensive and labour-intensive process. Furthermore, the connecting together of these two components represents an additional costly manufacturing step and the fact that two different materials are used makes recycling of the valve after use impracticable.

In the valves referred to above, the purpose of the slits is to define valve flaps which are capable of movement relative to the remainder of the valve body in order to open and close one or more openings through which a flowable material may pass. A further known type of valve, which is used in connection with waste water and the like and not for domestic purposes, such as with toiletries or foodstuffs, is the pinch valve. In a valve of this type, the slit itself constitutes the opening through which the flowable material may pass. Such valves are typically of one-piece, generally tubular construction and are moulded of rubber or elastomeric material. They have an inlet end which is normally at least roughly circular and their side wall includes two generally flat opposed portions, whose side edges are connected by arcuate side portions and which are inclined towards one another and meet at an elongate, generally straight apex, at which a slit is defined. When the pressure within the valve exceeds the external pressure, the two edges of the opposed flat portions defining the apex, that is to say the two edges of the slit, are moved apart and the valve is opened. Whilst cheap and effective for certain applications, such valves only close reliably when the external pressure exceeds the pressure within the valve body and this fact alone make such valves impracticable for domestic use as a dispensing valve. Furthermore, the slit has to be created by a separate cutting and slitting process after the valve has been moulded and the expense of this process makes such valves unacceptable for use on containers for widespread domestic use.

The provision of a slit in an injection moulded component has previously always required a separate manufacturing step subsequent to the actual moulding process and it is an object of the invention to provide a method of injection moulding a plastics component in which the slit is formed during and as part of the injection moulding process thereby eliminating the separate step of subsequently forming the slit. It is a further object of the present invention to provide an injection moulded dispensing valve of the type which includes one or more slits which has the simplicity and advantages of the valves referred to above but avoids the disadvantage of both types of valve.

SUMMARY OF THE DISCLOSURE

According to the present invention a method of injection moulding a plastics component includes providing a first mould member affording a mould cavity, which is defined by an internal surface, and a second mould member with an external surface whose shape is substantially complementary to the shape of the mould cavity, one of the internal surface and the external surface carrying an elongate formation which defines an elongate apex, advancing the second mould member into the mould cavity such that the apex is spaced from the opposed one of the internal surface and the external surface by a predetermined distance and the internal surface of the first mould member and the external surface of the second mould member together define a mould space, injecting molten polyolefin material into the mould space to substantially fill it, the predetermined distance being so dimensioned that the polyolefin material does not completely fill the space between the apex and the opposed surface. Thus in the method in accordance with the invention a very narrow gap is defined in the mould space between an apex or vertex of an elongate, projecting formation on one of the mould members and the opposed surface of the other mould member. When molten polyolefin material is injected into the mould space it rapidly fills most of it but the narrow elongate gap forms a significant flow barrier and in practice the molten material approaches this gap and flows into it substantially symmetrically from both sides. If the gap is appropriately dimensioned the two flow fronts of plastic material will substantially meet along a line running along the apex but do not fuse together. The reason for this is not fully understood but it is believed to be due to the relatively rapid cooling that occurs due to the narrowness of the gap and the resulting relatively high rate of temperature drop that occurs above the apex. The fact that the two fronts meet but do not fuse together means that a discontinuity or slit is formed in the moulded product, whose width is negligible or substantially zero, whereby the edges of the slit form a substantial seal.

The size of the gap that is defined is of critical importance and the predetermined distance is preferably between 0.0075 and 0.075 mm and more preferably between 0.01 and 0.03 mm. If the predetermined distance has a value above the range given the polyolefin material can flow through the gap and no slit is formed. If the predetermined distance has a value below the range given, a slit or elongate hole is formed in the finished product but this would have an appreciable width which would not produce an acceptable seal in a dispensing valve.

If the slit or discontinuity is viewed on a microscopic scale it may be seen that the two flow fronts clearly do not advance into the gap along two straight lines but instead advance into along somewhat irregular, that is to say wavy and/or jagged, lines. The two sides of the slit are therefore observed to be in contact, thus forming a perfect seal at some areas but to be spaced apart by a microscopic distance at other areas. This means that the slit will form a perfectly adequate seal to viscous liquids, such as many toiletry preparations, but will allow the passage of air. This is the ideal characteristic for a dispensing valve for a viscous toiletry composition which is normally stored in an inverted position because the composition will be prevented from leaking but air may flow into the container to fill the volume previously occupied by an amount of the composition which has been dispensed, thereby permitting a squeezable dispensing container to return to its original shape under the resilience of its deformed wall.

The movement of the two flow fronts of molten polyolefin material into the narrow gap defined by the apex and the opposing surface may be prevented by the presence of air trapped in the gap but this may be prevented by venting air from the gap during the injection process.

The apex on the projecting formation may be defined by two surfaces inclined at an acute angle which meet at a line and it is of course this line which constitutes the apex. It may also be possible for the two surfaces to merge via an arcuate surface and it is preferred that the radius of curvature of such a surface is in the range of 0.03 mm to 1 mm.

The ability of the molten polyolefin to flow into the gap would be expected to vary with the injection pressure but it is found that it is in fact relatively insensitive to variations in this pressure within the range of pressure which is conventionally used for injection moulding. This ability does, however, vary with the viscosity, that is to say melt flow index of the polyolefin and it is preferred that the melt flow index of the polyolefin material is between 4 g and 40 g per 10 minutes and preferably between 8 g and 26 g per 10 minutes.

As mentioned above, the method of the present invention is particularly suitable for producing dispensing valves. Such a valve may be of the type in which the flowable material flows through the slit itself and thus in one embodiment the component is a dispensing valve of generally duckbill type including two opposed valve plates which are inclined to one another and meet at an apex at which they are separated by a slit, the internal surface of the first mould member includes two first portions which are opposed and inclined to one another and meet at an elongate internal apex, the external surface of the second mould member includes two second portions which are inclined to one another and meet at an elongate external apex and the second mould member is advanced into the mould cavity until the external apex is spaced from the internal apex by the predetermined distance.

As mentioned above, the slit forms a seal to viscous liquids but not to air and the sealing integrity may be enhanced if the two first portions of the internal surface of the mould cavity are connected together by two third portions of the internal surface and the two second portions of the external surface of the mould member are connected together by two fourth portions of the external surface, whereby when the external apex is spaced from the internal apex by the predetermined distance the first and second portions are spaced apart by a first distance and the third and fourth portions are spaced apart by a second distance, the second distance being at least 10% and preferably at least 20% greater than the first distance. Thus the valve made in accordance with this aspect of the invention will have two inclined valve plates which together define a slit and are integrally connected by two curved portions of greater thickness. When the moulded component is allowed to cool, the two portions of greater thickness will contract more than the two thinner valve plates and this greater contraction will result in the two valve plates being placed under tension parallel to the slit. This tension will tend to hold the slit closed and thus to enhance the sealing integrity of the valve.

In a further embodiment of dispensing valve the flowable material does not flow through the slit but through an opening which is normally closed by a flap which is defined by one or more slits. Thus, in this embodiment the component is a dispensing valve of the type including a valve plate in which at least one slit is formed, the slit or slits defining one or more valve flaps which are separated from the remainder of the valve plate over a proportion of their periphery by the slit or slits and are integral with the remainder of the valve plate over the remainder of their periphery along a hypothetical line which constitutes an integral hinge, whereby the or each valve flap may bend along its integral hinge to open a flow opening, the first mould member and the second mould member affording opposed surfaces together defining a plate-shaped mould space when the second mould member is advanced into the mould cavity, one of the opposed surfaces carrying at least one elongate formation which defines an elongate apex, the elongate apex or apexes being in the desired pattern of the slit or slits in the valve plate.

If the dispensing valve is to have only one movable valve flap, it will have only a single slit of generally U shape or two slits inclined to one another at an acute angle and in this event one of the opposed surfaces of the two mould members will carry a single elongate formation with an apex of generally U shape or two elongate formations with apexes extending at an acute angle. If the valve is to have three, four or even more valve flaps, one of the opposed surfaces of the two valve members will carry a plurality of elongate formations with apexes radiating from a single point such that the resultant slits define the required number of movable valve flaps.

Further features and details of the invention will be apparent from the following description of three specific embodiments which is given by way of example only with reference to the accompanying drawings.

DESCRIPTION OF THE PREFERRED EMBODIMENT

Figure 1:
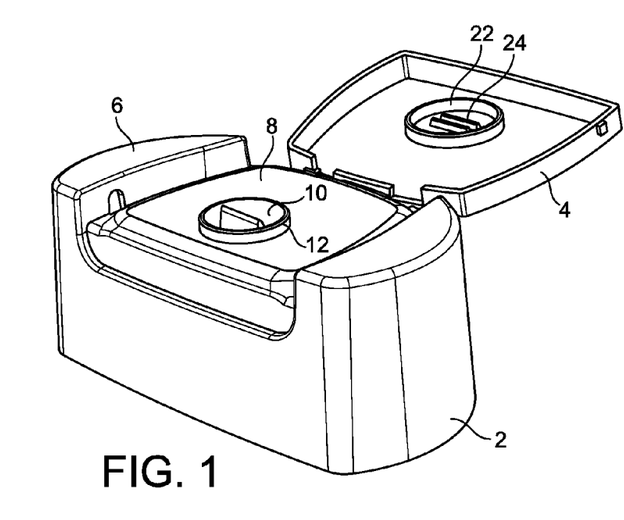
FIG. 1 is a perspective view of the upper portion of a toiletries container incorporating a dispensing valve made in accordance with the invention.
Figure 2:
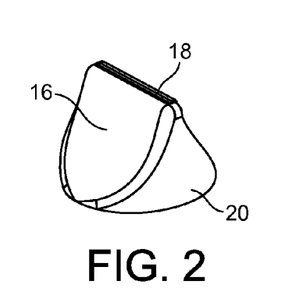
FIG. 2 is a perspective fragmentary view showing only the dispensing valve.
Figure 3:
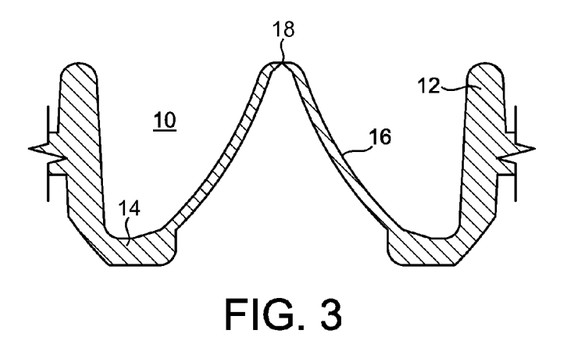
FIG. 3 is vertical sectional view through the dispensing valve.
Figure 4:
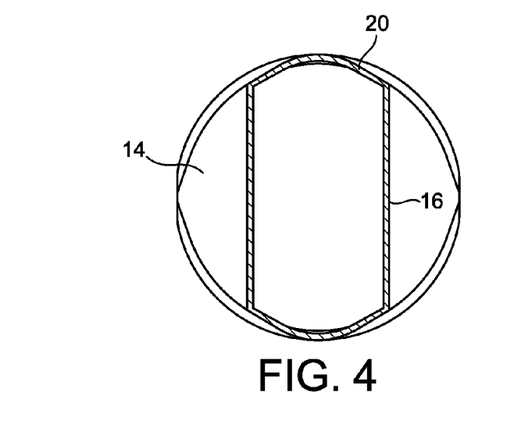
FIG. 4 is a horizontal sectional view through the dispensing valve.

FIGS. 1 to 4 show a dispensing valve made in accordance with a first embodiment of the invention, which forms an integral part of the upper portion of a toiletries container, e.g. for shampoo, hair conditioner or the like. FIG. 1 shows the upper portion of the container, which, in use, is connected to the lower portion of the container, e.g. by welding or snap fitting. The upper portion of the container shown in FIG. 1 includes a cap 2, connected to one side of which by an integral hinge is a lid 4. The cap 2 is of rounded rectangular shape in plan view and at each end has a raised or upwardly extending portion 6. Between the two portions 6 is a recess, the lower surface 8 of which is substantially flat. Formed in the surface 8 is a recess or well 10 surrounded by an upstanding rim 12. At the bottom of the well 10 is a plate, referred to as a base plate 14, formed centrally in which is an aperture. Extending around and integral with the edge of the aperture is a dispensing valve, which is best seen in FIG. 2. This valve is generally of duckbill type and comprises two laminar, generally flat walls or valve plates 16, which are opposed to one another and inclined to one another at an acute angle. The two valve plates 16 are tapered at their free ends and these ends abut one another or are spaced apart by an irregular gap 18 of negligible thickness, as will be described in more detail below. The side surfaces of the two valve plates are integral with the side edges of end walls 20, such that the valve is of continuous annular shape in horizontal cross section. The walls 16 are typically 0.8 mm thick and the walls 20 are preferably 20% or more thicker than the walls 16.

Formed on the underside of the lid 4, which is the upper side when in the open position seen in FIG. 1, is an annular boss 22 whose internal diameter is substantially the same as that of the external diameter of the rim 12. Positioned centrally within the boss 22 are two elongate formations 24 which define between them a space whose size and shape corresponds to and is in practice very slightly smaller than that of the upper portion of the valve. The boss 22 and projections 24 are positioned such that when the lid 4 is moved pivotally into the closed position, in which it occupies the space between the two raised formations 6 and its upper surface is contiguous with the upper surfaces of the formation 6, the boss 22 fits around and accommodates the rim 12 whilst the formations 24 engage the two valve plates and squeeze them together and this enhances or increases the sealing integrity of the two free ends of the valve plate 16.

The cap 2, lid 4 and the dispensing valve shown in FIGS. 1 to 4 constitute a one-part moulding of polyolefin material, such as polyethylene or polypropylene. It is made by an injection moulding process and the mould is shown diagrammatically in FIGS. 5 to 7. The mould includes a female member 26, which defines a mould cavity whose shape is the same as that of the external shape of the cap 2. The mould also includes a male member 28, which is advanced into the female member to define a space, whose shape is of course that of the cap 2. In the region in which the mould members define the space in which the valve is formed the female mould member has two generally flat first surface portions 30, which are opposed to one another and inclined to one another. The two surfaces 30 are connected at their upper ends, as seen in FIGS. 6 and 7, by a generally horizontal surface 32, whereby the surfaces 30 and 32 define an internal apex. In the same region, the male mould member has two inclined surfaces 34 which are complementary to the surfaces 30 and are thus opposed to one another and inclined to one another. The two surfaces 34 are inclined to one another at an acute angle of e.g. 20° to 40° and merge at their upper ends into surfaces 36 which are inclined to one another at e.g. 60° to 120° and meet at an external apex 38. The length of the apex 38, that is to say its dimension in a direction perpendicular to the plane of FIGS. 6 and 7 is equal to the desired length of the slit that is to be formed. Formed in the female member 26 is a vent passage 40, which opens out through the surface 32. Accommodated within the vent passage 40 is a vent pin 42, whose cross sectional area is slightly less than that of the passage 40, whereby a small gas leakage path is defined.

Figure 5:
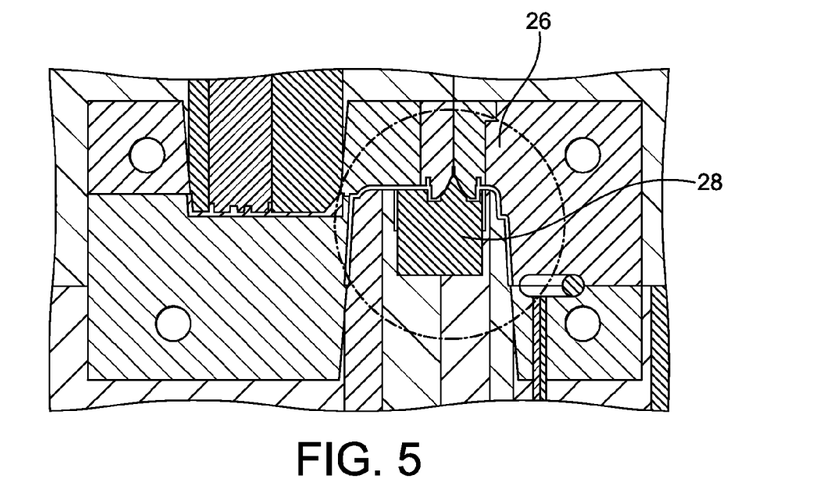
FIG. 5 is a scrap sectional view of a portion of the mould used to produce the upper portion of the toiletries container shown in FIG. 1 with the mould members shown in the engaged position prior to the injection of the polyolefin material.
Figure 6:
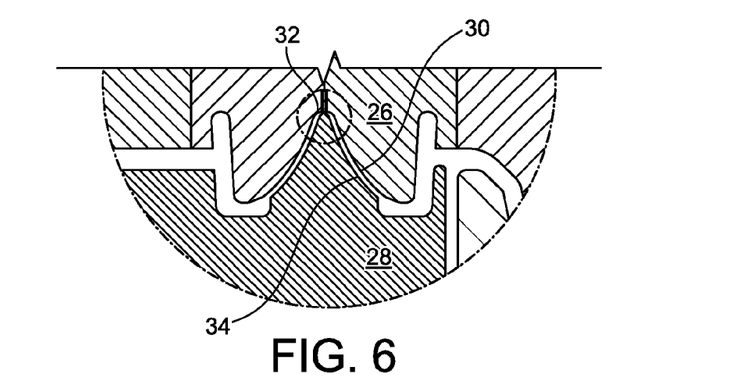
FIG. 6 is a scrap enlarged view of the mould of FIG. 5 showing the region in which the dispensing valve is produced.
Figure 7:
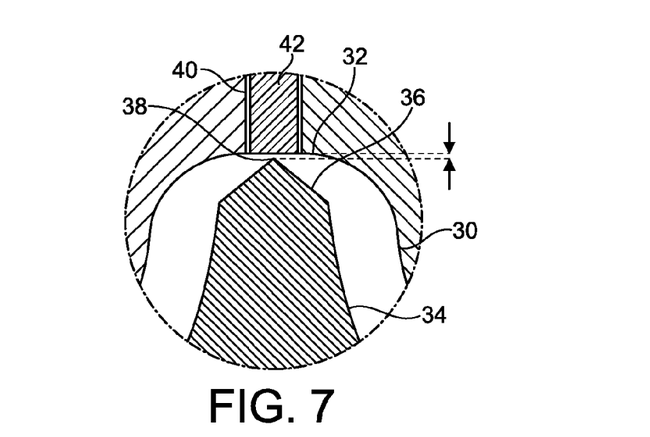
FIG. 7 is a yet further enlarged view of the mould showing only the region of the internal and external apexes.

In use, the male mould member is advanced into the mould cavity defined by the female mould member into the position shown in FIGS. 5 to 7. The male mould member is advanced until the external apex 38 is spaced from the surface 32 by a very small distance of between 0.0075 mm and 0.075 mm. The precise size of this dimension required to produce the effect of the present invention will depend on the characteristics of the polyolefin material that is used, particularly its melt flow index, and may be readily determined by experimentation. Molten polyolefin material is then injected into the mould cavity in the conventional manner at a location which ensures that the molten polyolefin fills the mould space between the surfaces 30 and 34 on each side substantially symmetrically. As the molten material enters the space defined on the two sides of the apex 38 between surfaces 36 and 32, the air that previously occupied that space is displaced through the pathway defined by the vent pin 42 within the vent passage 40. As the two fronts of molten material approach the apex 38, it is believed that the very small area of the mould space at this point results in cooling and thus partial solidification of the surfaces of the advancing fronts of polyolefin material. These two fronts meet along a line above the elongate external apex 38 but do not fuse together. The moulding is subsequently ejected from the mould in the conventional manner and microscopic examination of the top end of the valve indicates that the two fronts of molten polyolefin material do not advance along a precisely straight line but instead along a somewhat irregular or jagged line. When the forwardly protruding portions of the two fronts of molten material contact one another, further advance of the fronts is prevented but microscopic gaps are left between adjacent protruding portions of the fronts. Accordingly, a slit is formed between the two upper, free ends of the valve plates 16, which is sufficient to prevent the passage of liquid material, particularly viscous material such as shampoo or hair conditioner, but the small gaps that are left as described above are sufficiently large to permit air to flow through the slit.

The two valve plates 16 are connected, as mentioned above, by walls 20 and the male and female mould members do of course afford surfaces which define the spaces in which these walls 20 are formed. The mould members are constructed and dimensioned such that the surfaces which define the spaces in which the walls 20 are formed are spaced further apart, typically 20% further apart or more, than the mould surfaces which define the spaces in which the valve plate 16 are formed. When the finished cover and integral dispensing valve are ejected from the mould, they undergo a rapid cooling process and the polyolefin material naturally shrinks during this process. However, the fact that the walls 20 are thicker than the walls 16 means that the shrinkage which occurs in the walls 20 is greater than that in the walls 16 and it is found that this differential shrinkage results in the walls 16 being placed under tension, particularly in the regions which define the slot 18. This tension serves to hold the abutting edges of the walls 16 defining the slot 18 together and this enhances the sealing integrity of the valve.

In use, when it is desired to dispense the contents of the container through the valve, the container is inverted and its outer wall is then squeezed. The increase in pressure which is thus produced is transmitted via the contents of the container to the valve plates 16 and this results in the edges of the plate 16 defining the slit 18 moving apart by a small distance to define a dispensing opening. The contents of the container can thus flow out through this opening and are dispensed as desired. When sufficient of the contents have been dispensed, the external pressure on the container is removed and this results in the internal pressure within the container reducing. The edges of the slit 18 thus move back towards one another under their own resilience, assisted by the tension produced by shrinkage, as described above, until they are again in substantial contact with one another. This contact is sufficient to form a seal to viscous material and further flow of the contents of the container is thus prevented. However, as mentioned above, the seal that is created is not sufficient to create an airtight seal and the sub-atmospheric pressure produced within the container due to the tendency of the previously compressed container wall to return to its internal shape results in air being sucked in gradually through the slit 18, thereby permitting the wall of the container to return to its previous, undeformed shape.

Figure 8:
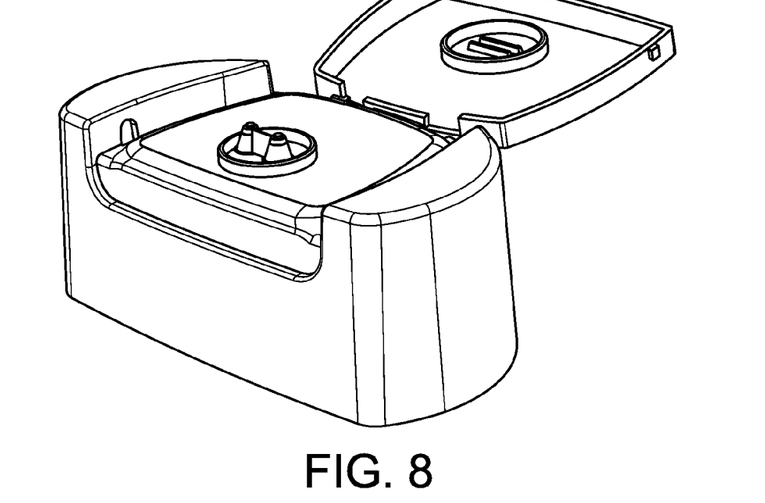
FIG. 8 is a view similar to FIG. 1 showing a second embodiment of dispensing valve.
Figure 9:
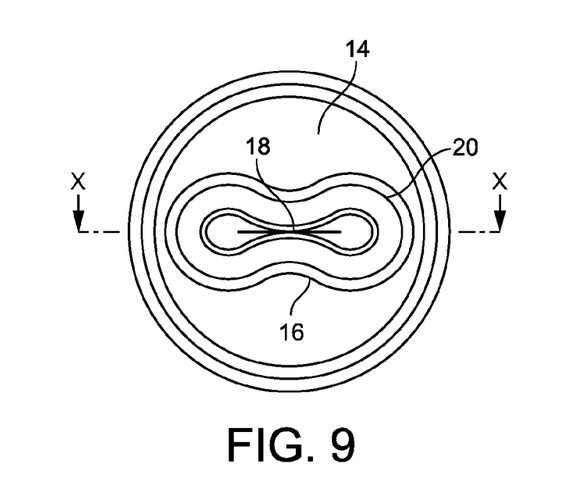
FIG. 9 is a plan view of the valve of the second embodiment.
Figure 10:
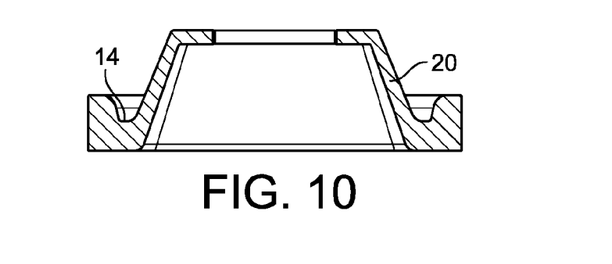
FIG. 10 is a vertical sectional view on the line x-x in FIG. 9 of the valve of the second embodiment.
Figure 11:
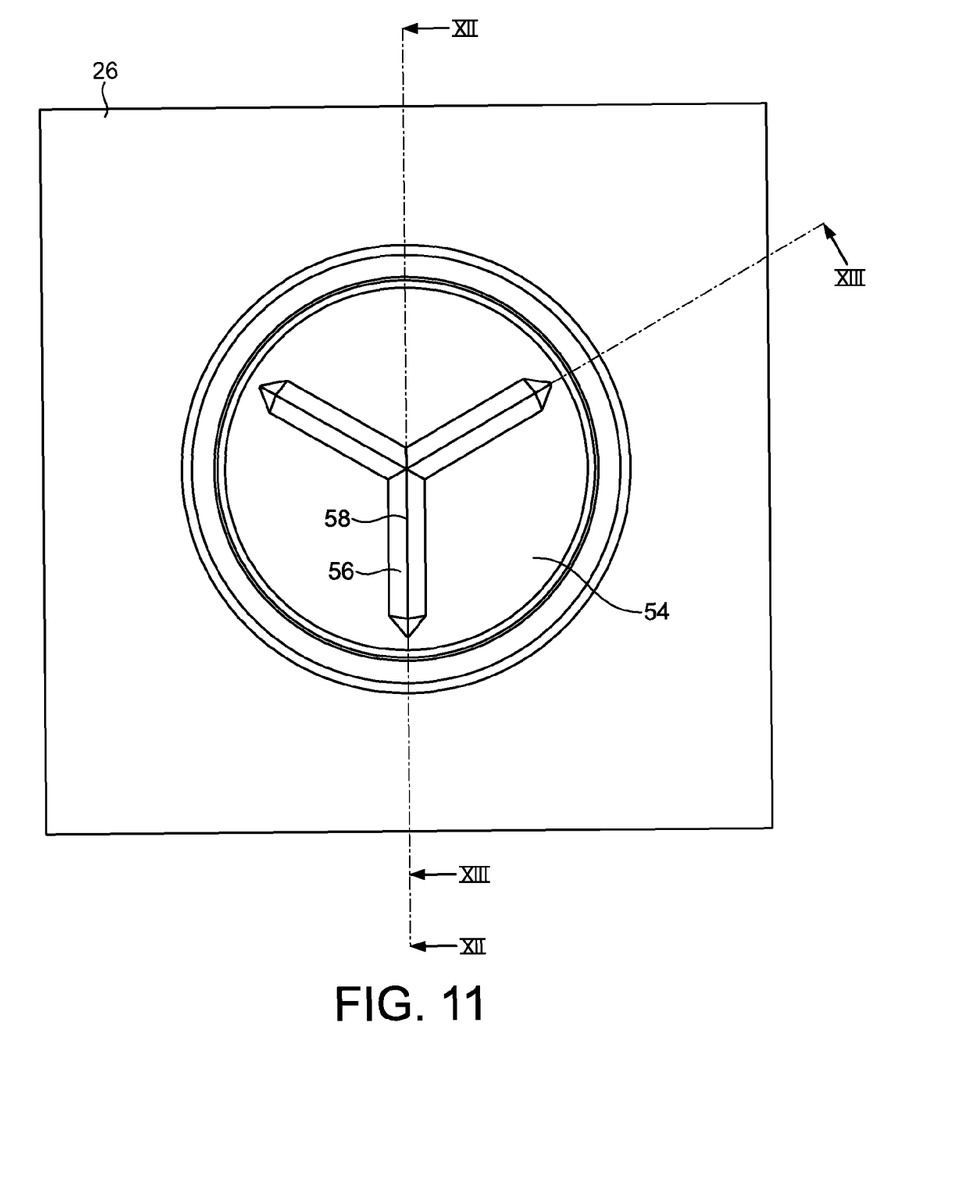
FIG. 11 is a highly diagrammatic view from above of the female portion of a mould member used to produce a third embodiment of dispensing valve.
Figure 12:
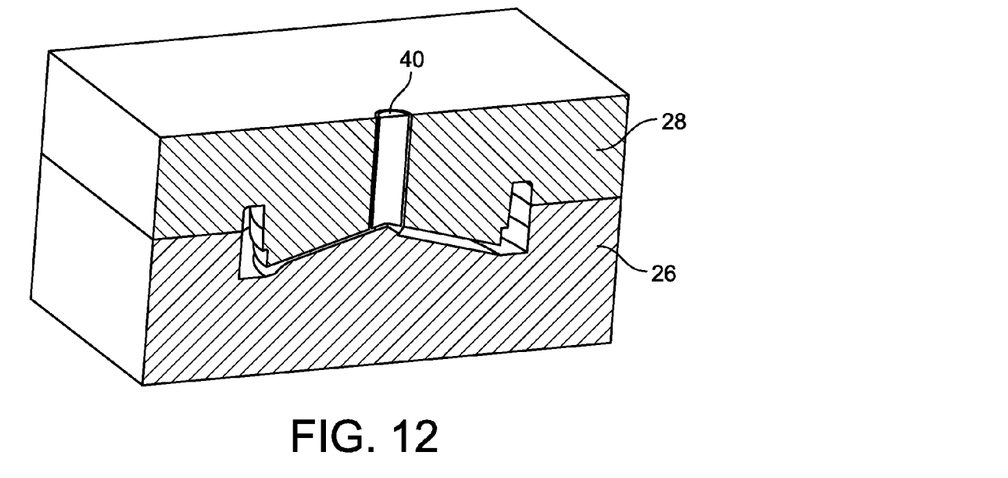
FIG. 12 is a perspective sectional view on the line xii-xii in FIG. 11, showing also the male portion of the other mould member in position.
Figure 13:
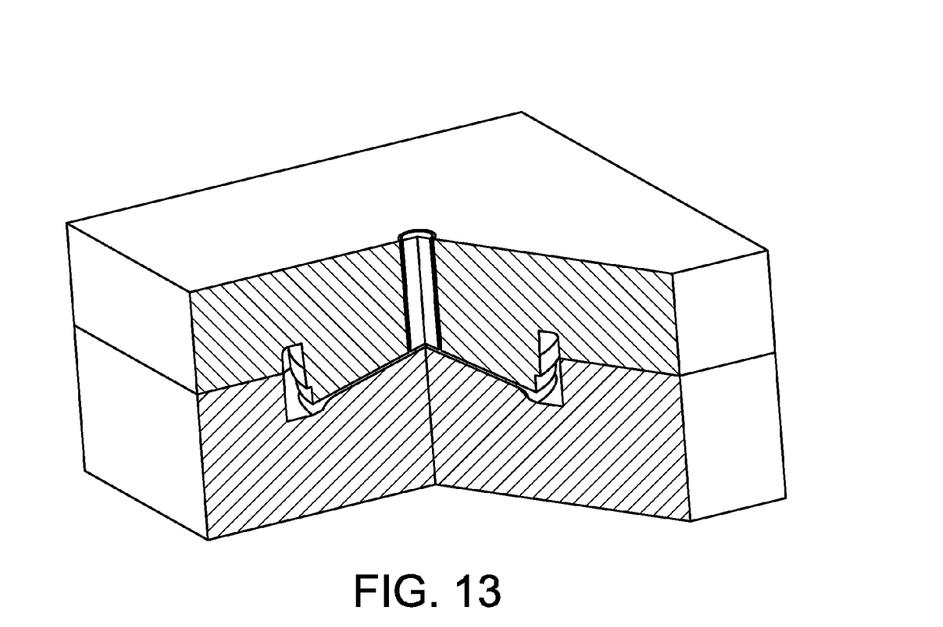
FIG. 13 is a perspective sectional view on the line xiv-xiv in FIG. 11.

The second embodiment of valve produced in accordance with the invention is shown in FIGS. 8 to 10 and since this is very similar to the valve shown in FIGS. 1 to 4, only those components which differ from those in FIGS. 1 to 4 will be described. Whilst the length of the base of the valve shown in FIGS. 1 to 4 is generally the same as or at least similar to its width, in the valve illustrated in FIGS. 8 to 10, its length is very substantially more than its width. Whilst the valve plate 16 in the valve showing FIGS. 1 to 4 are generally flat, though curved somewhat in the vertical direction, the valve plates 16 in the valve FIGS. 8 to 10 are curved somewhat in the horizontal direction. Furthermore, the walls 20 extend beyond the valve plates 16, when the valve is viewed from one end in the direction parallel to the length of the slit 18. The walls 20 may again be slightly thicker than the valve plates 16 but the bulbous shape of the walls 20 mean that they in any event include significantly more material than the walls 20 in the valve of FIGS. 1 to 4 and thus that the shrinkage which occurs on ejection of the valve from the mould produces a tension in the valve plates 16 along the length of the slit 18 and this may be significantly greater than in the valve of FIGS. 1 to 4. Accordingly, the sealing integrity of the valve of the second embodiment may be somewhat higher than that of the valve of the first embodiment. The method by which the valve of the second embodiment is made is essentially the same as that by which the first embodiment is made but the shape of the mould members will of course need to be altered somewhat to produce the desired shape of the valve.

In the valves of the first and second embodiments, the material that is to be dispensed from a container flows through the slit, the edges of which are forced apart somewhat by the pressure created within the container. However, in the third embodiment of dispensing valve in accordance with the invention illustrated in FIGS. 15 to 17, the material to be dispensed does not flow through the slit but instead one or more slits are provided which define one or more valve flaps in the base plate of the valve and the valve flaps are caused to move under the pressure created within the container to create flow openings through which the material is dispensed. The container cap is much the same as in the first and second embodiments and the bottom of the well 10 in the upper surface 8 of the cap is again closed by a base plate 14. However, in this case, there are three slits formed in the base plate 10 which radiate from the centre of the base plate 10 and are equiangularly spaced, that is to say each slit 18 defines an angle of 120° with each of the other slits. The three slits thus divide the base plate 14 into three symmetrical valve flaps 50, each of which may be considered to be connected to the remainder of the base plate 14 by an integral hinge, that is to say the plastic material on the hypothetical line which extends between the outer ends of the two slits 18 defining the flap. The adjacent edges of the flaps defining the three slits 18 form a substantial seal with one another but this seal is of the type described in connection with the first and second embodiments, that is to say it is sufficient to prevent the passage of liquid material, particularly viscous material, but it does provide very fine pathways for the flow of air.

Figure 14:
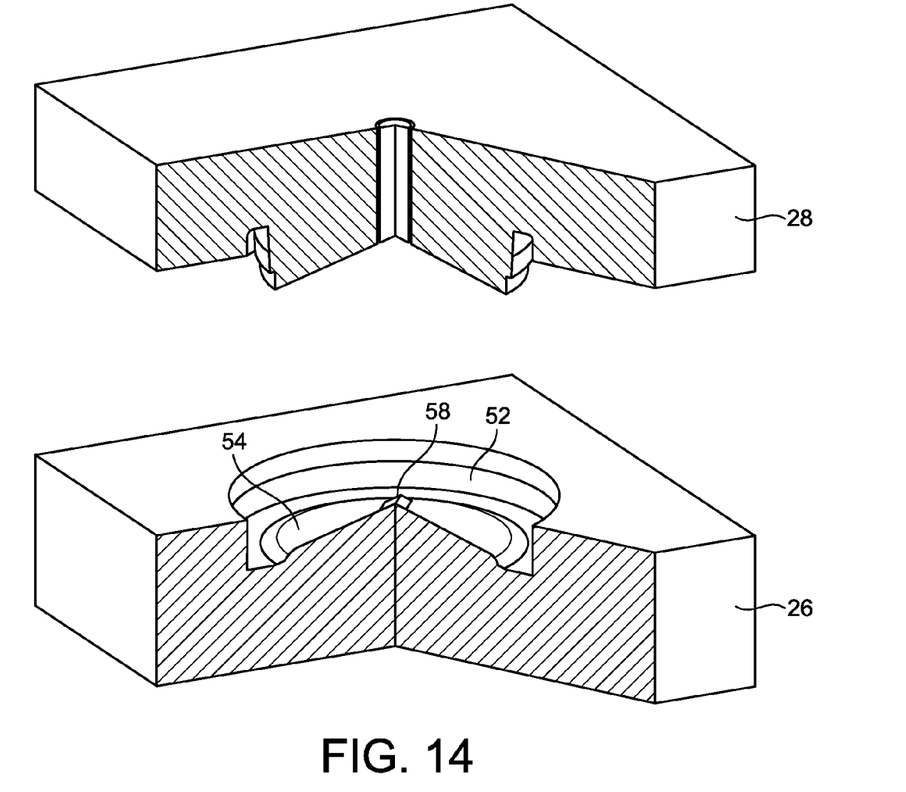
FIG. 14 is a partly cut away perspective view showing the male mould portion in position prior to entry into the female mould portion shown in FIG. 11.

The three slits in the base plate 14 are formed by essentially the same method as that described in connection with the first and second embodiments and the portions of the mould which form the valve are illustrated in FIGS. 11 to 14, all of which are highly diagrammatic views of one or both portions of the mould members which form the dispensing valve. The remaining portions of the mould members which form the remainder of the container cap have been omitted for the sake of simplicity. As may be seen, the female mould portion 26 defines a circular section cavity 52, whose base 54 is inclined upwardly from its outer edge to its centre. Formed on or attached to the base are three elongate formations 56, which radiate outwardly from the centre of the base and are spaced apart from one another by 120°. Each formation 56 is of generally triangular section and its two outer edges are inclined to one another and meet at an elongate external apex 58. The male mould portion 28 has a projecting circular section punch portion with an end surface which is inclined in the same manner as the surface 54 on the female portion but is otherwise smooth. Before moulding commences, the male and female mould portions are positioned as shown in FIG. 14 and they are then moved towards one another until the apexes 58 are spaced from the opposed surface of the male portion 28 by the very small distance referred to above. The remainder of the opposing surfaces of the male and female portions are however spaced apart by a substantially larger distance so as to define a mould space corresponding to the shape and size of the valve. Molten polyolefin material is then injected into the mould space and, as described in connection with the first embodiment, substantially fills the mould space and advances symmetrically towards and into the spaces defined between the apexes 58 on the female portion and the opposing surface of the male portion. As described previously, the advancing fronts of polyolefin material meet along lines corresponding to the positions of the apexes but do not fuse together, whereby the three slits are produced at positions corresponding to the positions of the apexes 58. As a result of the inclination of the surface 54 on the female mould portion and of the corresponding inclination of the opposing surface on the male mould portion, the valve base plate 14 is inclined upwardly from its outer edge to its centre, as may be seen clearly in FIG. 16. This inclination, which is typically between 10° and 25°, is found to enhance the sealing integrity of the valve.

Figure 15:
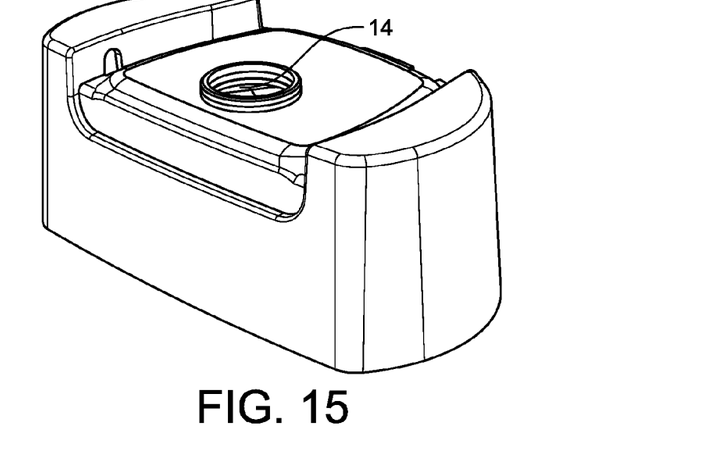
FIG. 15 is a perspective view of the lid of a toiletries container incorporating a dispensing valve in accordance with the third embodiment of the invention.
Figure 16:
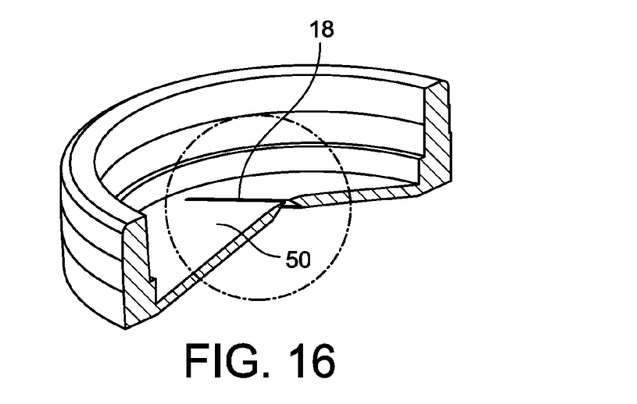
FIG. 16 is a partly cut away fragmentary perspective view of the dispensing valve shown in FIG. 15.
Figure 17:
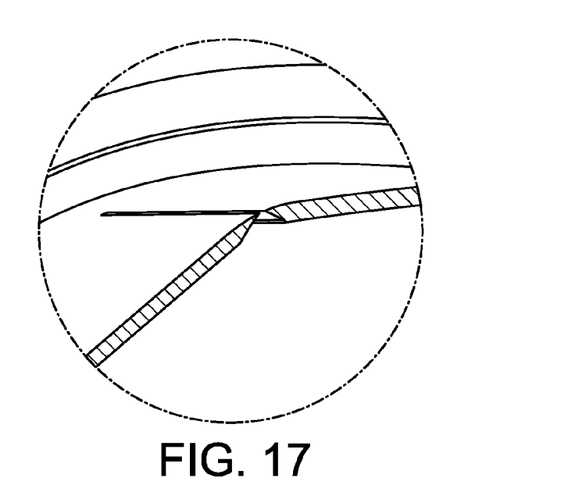
FIG. 17 is an enlarged perspective view of the portion of the valve which is ringed in FIG. 16.

Although three slits are formed in the valve illustrated in FIGS. 15 and 17 so as to define three valve flaps 50, it will be appreciated that the number of slits may be varied at will to provide any desired number of valve flaps. Thus four slits could of course readily be provided spaced from one another by 90° so as to provide four valve flaps and it would be possible for there to be only a single slit, though in this case the slit would need to be of generally U shape or V shape so as to define a single valve flap. All that is required to produce these modified constructions is to arrange the or each upstanding formation on the female mould portion appropriately. It will be appreciated also that it is not essential that the or each upstanding formation is provided on the female mould portion and they could readily be provided on the male mould portion and indeed it might even be desirable under certain circumstances to provide cooperating projecting formations affording an apex on both the male and female mould portions, the or each pair of upstanding formations being positioned such that their apexes are in alignment with one another and are spaced apart, during injection of the polyolefin material, by the small distance referred to above.

The invention claimed is:

1. A method of injection moulding a plastics component with a slit including providing a first mould member affording a mould cavity, which is defined by an internal surface, and a second mould member with an external surface whose shape is substantially complementary to the shape of the mould cavity, one of the internal surface and the external surface carrying an elongate formation which defines an elongate apex, advancing the second mould member into the mould cavity such that the apex is spaced from the opposed one of the internal surface and the external surface by a predetermined distance of between 0.0075 and 0.075 mm and the internal surface of the first mould member and the external surface of the second mould member together define a mould space, injecting molten polyolefin material into the mould space to substantially fill it and venting displaced air from the space between the apex and the opposed surface during the injection of the polyolefin material, the predetermined distance being so dimensioned that the polyolefin material does not completely fill the space between the apex and the opposed surface, whereby the slit is formed, wherein the width of the slit is sufficiently small or substantially zero, whereby the edges of the slit form a substantial seal.

2. A method as claimed in claim 1 in which the predetermined distance is between 0.01 and 0.03 mm.

3. A method as claimed in claim 1 in which the apex is defined by two surfaces inclined at an acute angle which meet at a line.

4. A method as claimed in claim 1 in which the melt flow index of the polyolefin material is between 4 g and 40 g per 10 minutes.

5. A method as claimed in claim 1 in which the melt flow index of the polyolefin material is between 8 g and 26 g per 10 minutes.

6. A method as claimed in claim 1 in which the component is a dispensing valve of generally duckbill type including two opposed valve plates which are inclined to one another and meet at an apex at which they are separated by the slit, the internal surface of the first mould member includes two first portions which are opposed and inclined to one another and meet at an elongate internal apex, the external surface of the second mould member includes two second portions which are inclined to one another and meet at an elongate external apex and the second mould member is advanced into the mould cavity until the external apex is spaced from the internal apex by the predetermined distance.

7. A method as claimed in claim 6 in which the two first portions of the internal surface of the mould cavity are connected together by two third portions of the internal surface and the two second portions of the external surface of the mould member are connected together by two fourth portions of the external surface, whereby when the external apex is spaced from the internal apex by the predetermined distance the first and second portions are spaced apart by a first distance and the third and fourth portions are spaced apart by a second distance, the second distance being at least 10% greater than the first distance.

8. A method as claimed in claim 6 in which the two first portions of the internal surface of the mould cavity are connected together by two third portions of the internal surface and the two second portions of the external surface of the mould member are connected together by two fourth portions of the external surface, whereby when the external apex is spaced from the internal apex by the predetermined distance the first and second portions are spaced apart by a first distance and the third and fourth portions are spaced apart by a second distance, the second distance being at least 20% greater than the first distance.

9. A method as claimed in claim 1 in which the component is a dispensing valve of the type including a valve plate in which at least one slit is formed, the slit or slits defining one or more valve flaps which are separated from the remainder of the valve plate over a portion of their periphery by the slit or slits and are integral with the remainder of the valve plate over the remainder of their periphery along a hypothetical line which constitutes an integral hinge, whereby the or each valve flap may bend along its integral hinge to open a flow opening, the first mould member and the second mould member affording opposed surfaces together defining a plate-shaped mould space when the second mould member is advanced into the mould cavity, one of the opposed surfaces carrying at least one elongate formation which defines an elongate apex, the elongate apex or apexes being in the desired pattern of the slit or slits in the valve plate.

10. A method as claimed in claim 9 in which the said one of the opposed surfaces carries three or more elongate formations, the apexes of which radiate from a single point, whereby the dispensing valve produced includes a number of valve flaps equal to the number of elongate formations.

11. A method of injection moulding a plastics component with a slit comprising:
  providing a first mould member with a first mould surface, and a second mould member with a second surface having a substantially complementary shape to the first mould surface and having an elongate apex;
  advancing one mould member relative to the other mould member such that the elongate apex of the second mould surface is spaced from the opposed portion of the first mould surface by a predetermined spacing of between 0.0075 and 0.075 mm, the first and second mould surfaces of the advanced members defining a mould space; and
  injecting injection mould material into the mould space to substantially fill the mould space, the predetermined spacing being sufficiently narrow to form a slit between the elongate apex and the opposing portion of the first mould surface during injection, wherein the width of the slit is sufficiently small such that the edges of the slit form a substantial seal to viscous liquid material.

12. The method of claim 11, wherein the step of injecting includes injecting the injection mould material from both sides of the elongate apex simultaneously and symmetrically.

13. The method of claim 11, wherein the step of advancing includes advancing the one mould member against the other mould member such that the predetermined spacing is between 0.01 and 0.03 mm.

14. The method of claim 11, wherein the step of injecting includes injecting the injection mould material while venting displaced air from the space between the elongate apex and the opposed portion of the first mould surface.

15. The method of claim 11, wherein the step of providing includes providing the second mould member with a second mould surface having an elongate apex defined by two surfaces inclined at an acute angle which meet at a line.

16. The method of claim 11, wherein the step of injecting includes injecting the injection mould material having a melt flow index between 4 g and 40 g per 10 minutes.

17. The method of claim 11, wherein:
  the step of providing includes providing the second mould surface having two portions which are inclined to one another and meet at the elongate apex;
  the step of advancing includes advancing the one mould member relative to the other mould member until the elongate apex is spaced from the opposed portion of the first mould surface; and
  the step of injecting includes injecting the injection mould material to produce a dispensing valve of generally duckbill type including two opposed valve plates which are inclined to one another and meet at a valve apex at which the two valve plates are separated by the slit.

\* \* \* \* \*